United States Patent
Ensling et al.

(10) Patent No.: US 9,614,247 B2
(45) Date of Patent: Apr. 4, 2017

(54) BUTTON CELL WITH WINDING ELECTRODE

(71) Applicant: VARTA Microbattery GmbH, Ellwangen (DE)

(72) Inventors: David Ensling, Ellwangen (DE); Edward Pytlik, Ellwangen (DE); Jürgen Ernsperger, Neuler (DE); Winfried Gaugler, Ellwangen-Eigenzell (DE); Berthold Häussler, Bopfingen-Aufhausen (DE); Claus-Christian Fischer, Ellwangen-Rotenbach (DE)

(73) Assignee: Varta Microbattery GmbH (DE)

( * ) Notice: Subject to any disclaimer, the term of this patent is extended or adjusted under 35 U.S.C. 154(b) by 0 days.

(21) Appl. No.: 14/434,842

(22) PCT Filed: Nov. 8, 2013

(86) PCT No.: PCT/EP2013/073453
§ 371 (c)(1),
(2) Date: Apr. 10, 2015

(87) PCT Pub. No.: WO2014/072494
PCT Pub. Date: May 15, 2014

(65) Prior Publication Data
US 2015/0236370 A1    Aug. 20, 2015

(30) Foreign Application Priority Data
Nov. 9, 2012   (EP) .................................... 12192064

(51) Int. Cl.
*H01M 10/04* (2006.01)
*H01M 2/12* (2006.01)
*H01M 10/0525* (2010.01)
*H01M 2/02* (2006.01)
*H01M 4/70* (2006.01)

(52) U.S. Cl.
CPC ......... *H01M 10/0431* (2013.01); *H01M 2/02* (2013.01); *H01M 2/024* (2013.01); *H01M 2/026* (2013.01); *H01M 2/0222* (2013.01); *H01M 2/0257* (2013.01); *H01M 2/0262* (2013.01);
(Continued)

(58) Field of Classification Search
None
See application file for complete search history.

(56) References Cited

U.S. PATENT DOCUMENTS 6,066,184 A    5/2000  Brenner
6,521,373 B1   2/2003  Suzuki et al.
(Continued)

FOREIGN PATENT DOCUMENTS

CN    201440429 U    4/2010
DE    31 13 309 A1   10/1982
(Continued)

*Primary Examiner* — Patrick Ryan
*Assistant Examiner* — Wyatt McConnell
(74) *Attorney, Agent, or Firm* — DLA Piper LLP (US)

(57) ABSTRACT

A button cell has a winding arranged in the cup-shaped, positive-polarity housing half such that one of the flat end sides points in the direction of the cup base, the circumferential outer side thereof bears against the circumferential cup wall and the outer side together with the cup wall forms a clamping zone in which the first current output conductor is clamped.

14 Claims, 2 Drawing Sheets

(52) U.S. Cl.
CPC ........... *H01M 2/1241* (2013.01); *H01M 4/70* (2013.01); *H01M 10/0525* (2013.01)

(56) References Cited

U.S. PATENT DOCUMENTS

| | | |
|---|---|---|
| 2002/0192559 A1 | 12/2002 | Yoshimura et al. |
| 2003/0013007 A1* | 1/2003 | Kaun .................. H01M 2/0227 429/94 |
| 2003/0077505 A1* | 4/2003 | Goda .................. H01M 2/0207 429/56 |
| 2011/0091753 A1* | 4/2011 | Wang .................. H01M 2/0222 429/94 |
| 2012/0100406 A1 | 4/2012 | Gaugler |
| 2013/0130066 A1 | 5/2013 | Pytlik et al. |
| 2013/0216881 A1 | 8/2013 | Gaugler |

FOREIGN PATENT DOCUMENTS

| | | |
|---|---|---|
| DE | 196 47 593 A1 | 5/1998 |
| DE | 10 2010 033 577 A1 | 2/2012 |
| EP | 1 079 454 A2 | 2/2001 |
| WO | 2010/146154 A2 | 12/2010 |
| WO | 2012/048995 A1 | 4/2012 |

\* cited by examiner

BUTTON CELL WITH WINDING ELECTRODE

TECHNICAL FIELD

This disclosure relates to button cells comprising a cylindrical housing which is closed in a liquid-tight manner and has a planar housing bottom side, a planar housing top side parallel thereto and a circumferential lateral housing casing lying therebetween, and also a winding-shaped assembly of at least one band-shaped positive electrode, at least one band-shaped negative electrode and at least one band-shaped separator within the housing.

BACKGROUND

Button cells conventionally comprise a housing consisting of two housing halves: what is termed a cell cup and what is termed a cell top. By definition, the cell cup has a positive polarity and the cell top has a negative polarity. These halves are conventionally often produced as stamped and drawn parts from nickel-plated deep-drawn sheet metal. The housing may contain a very wide variety of electrochemical systems, for example, zinc/$MnO_2$, primary and secondary lithium-ion systems or secondary systems such as nickel/cadmium or nickel/metal hydride.

The liquid-tight closure of button cells is conventionally carried out by crimping the edge of the cell cup over the rim of the cell top using a plastic ring arranged between the cell cup and the cell top and is used simultaneously as a sealing element and for the electrical insulation of the cell cup and the cell top. Such button cells are described, for example, in DE 31 13 309 A1.

Particularly button cells which comprise a lithium-ion system often have a winding-shaped assembly of at least one band-shaped positive electrode, at least one band-shaped negative electrode and at least one band-shaped separator. In such button cells, the electrodes generally connect to the electrodes via metallic current output conductors, the current output conductors usually being welded onto the housing halves. However, the contact-connection of the housing halves often causes difficulties or is very complex. In a lithium-ion system (which generally supplies a voltage of 2.5 to 4.2 V), the condition of the housing often also plays a considerable role. Particularly on the cathode side, conventional steel housings often do not satisfy the requirements with respect to permanent electrochemical stability, particularly at points of contact with the current output conductors. As a consequence, corrosion and gassing phenomena can arise within the cell housing, and these can irreversibly damage the cell.

It could therefore be helpful to provide button cells which are better matched to the described requirements than conventional button cells.

SUMMARY

We provide a button cell including a cylindrical housing closed in a liquid-tight manner and having a planar housing bottom side, a planar housing top side parallel thereto and a circumferential lateral housing casing arranged therebetween, and an assembly of at least one band-shaped positive electrode, at least one band-shaped negative electrode and at least one band-shaped separator within the housing, wherein the housing consists of a positive-polarity and a negative-polarity metallic housing half separated from one another by an electrically insulating seal, the at least one positive electrode includes a first band-shaped current collector covered by electrochemical active material and electrically connected to the positive-polarity housing half via a first metallic current output conductor, the at least one negative electrode includes a second band-shaped current collector covered by electrochemical active material and electrically connected to the negative-polarity housing half via a second metallic current output conductor, the assembly is a spiral-shaped winding having two flat end sides and a circumferential outer side, and the positive-polarity housing half has a cup-shaped form and a cup base, a circumferential cup wall, a cup edge with a terminal cutting edge and a cup opening defined by the cup edge, the winding is arranged in the cup-shaped, positive-polarity housing half such that one of the flat end sides points in the direction of the cup base, the circumferential outer side thereof bears against the circumferential cup wall and the outer side together with the cup wall forms a clamping zone in which the first current output conductor is clamped, the positive-polarity housing half consists of aluminum or of an aluminum alloy and the negative-polarity housing half consists of sheet steel or sheet iron, the positive-polarity housing half is arranged with the cup edge thereof to the fore into the cup-shaped negative-polarity housing half made of sheet steel or sheet iron, and the first current output conductor consists of aluminum or an aluminum alloy and is a terminal partial region of the first current collector not covered by electrochemical active material.

We also provide a button cell including a cylindrical housing closed in a liquid-tight manner and having a planar housing bottom side, a planar housing top side parallel thereto and a circumferential lateral housing casing arranged therebetween, and an assembly of at least one band-shaped positive electrode, at least one band-shaped negative electrode and at least one band-shaped separator within the housing, wherein the housing consists of a positive-polarity and a negative-polarity metallic housing half separated from one another by an electrically insulating seal, the at least one positive electrode includes a first band-shaped current collector covered by electrochemical active material and electrically connected to the positive-polarity housing half via a first metallic current output conductor, the at least one negative electrode includes a second band-shaped current collector covered by electrochemical active material and electrically connected to the negative-polarity housing half via a second metallic current output conductor, the assembly is present in the form of a spiral-shaped winding having two flat end sides and a circumferential outer side, the positive-polarity housing half has a cup-shaped form and a cup base, a circumferential cup wall, a cup edge with a terminal cutting edge and a cup opening defined by the cup edge, and the winding is arranged in the cup-shaped, positive-polarity housing half such that one of the flat end sides points in the direction of the cup base, the circumferential outer side thereof bears against the circumferential cup wall and the outer side together with the cup wall forms a clamping zone in which the first current output conductor is clamped.

DETAILED DESCRIPTION

Figure 1:
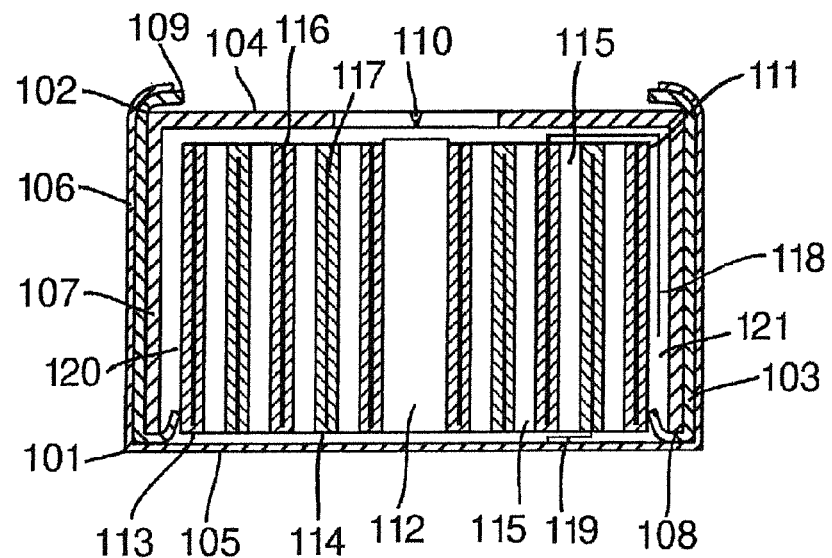
FIG. 1 shows a cross section of a first example of a button cell (schematic illustration).

Our button cells also always comprise two metallic housing halves (a positive-polarity housing half and a negative-polarity housing half) separated from one another by an electrically insulating seal and together with the latter form a cylindrical housing closed in a liquid-tight manner. The housing generally has a planar housing top side, a planar housing bottom side parallel thereto and a circumferential lateral housing casing lying therebetween. The planar top side and the planar bottom side usually have a circular or oval form.

An assembly of at least one band-shaped positive electrode, at least one band-shaped negative electrode and at least one band-shaped separator is located within the housing. The at least one positive electrode comprises a first band-shaped current collector covered by electrochemical active material and electrically connected to the positive-polarity housing half via a first metallic current output conductor. The at least one negative electrode comprises a second band-shaped current collector covered by electrochemical active material and electrically connected to the negative-polarity housing half via a second metallic current output conductor.

The current collectors are usually sheet-like substrates, for example, a metal foil or a metallic mesh or grating covered on one or both sides by electrochemical active material. Electrochemical active material in this respect refers to a material undergoing a chemical modification during charging and/or discharging operations, in particular through uptake or release of ions. Alternatively, the current collectors can also be present in the form of thin metal threads or threads coated with metal embedded in a matrix of the electrochemical active material.

The button cells are preferably lithium-ion button cells, i.e., button cells in which lithium ions migrate from the at least one negative electrode to the at least one positive electrode or, conversely, from the at least one positive electrode to the at least one negative electrode during charging and/or discharging operations. In this case, the current collector of the at least one positive electrode usually consists of aluminum or of an aluminum alloy, and the current collector of the at least one negative electrode preferably consists of copper or of a copper alloy. All materials which can take up lithium ions and release them again are suitable in principle as electrochemical active materials. The prior art in this respect for the negative electrode are, in particular, particles based on carbon such as graphitic carbon or non-graphitic carbon materials capable of intercalating lithium. Furthermore, it is also possible to use metallic and semimetallic materials which can be alloyed with lithium. Thus, by way of example, the elements tin, antimony and silicon are able to form intermetallic phases with lithium. For the positive electrode, the active materials used in industry at this point in time comprise primarily lithium cobalt oxide ($LiCoO_2$), $LiMn_2O_4$ spinel, lithium iron phosphate ($LiFePO_4$) and derivatives such as, for example, $LiNi_{1/3}Mn_{1/3}Co_{1/3}O_2$ or $LiMnPO_4$. All electrochemically active materials are generally present in particle form in the electrodes. In addition, electrodes often comprise, again in particulate form, conductivity improvers, for example, carbon black. The mechanical strength of the electrodes is ensured usually by an electrode binder, for example, a binder based on carboxymethylcellulose, polyacrylate or polyvinylidene fluoride.

In contrast to the collectors, the first and the second metallic current output conductors are not covered with electrochemical active material. In the discharging mode, electrons collected by the second current collector of the at least one negative electrode are forwarded via the second metallic current output conductor to the negative-polarity housing half. Conversely, in the charging mode, electrons are fed to the at least one negative electrode via the second current output conductor and the second current collector.

If the button cell is a lithium-ion button cell, the first current output conductor preferably consists of aluminum or of an aluminum alloy, and the second current collector preferably consists of copper or of a copper alloy.

The assembly of the electrodes and the at least one separator is present in the form of a spiral-shaped winding, which has two flat end sides and a circumferential outer side, whereas the positive-polarity housing half preferably has a cup-shaped form and has a cup base, a circumferential cup wall, a cup edge with a terminal cutting edge and a cup opening defined by the cup edge.

The button cell is particularly characterized in that the winding is arranged in the cup-shaped, positive-polarity housing half such that one of the flat end sides points in the direction of the cup base, the circumferential outer side thereof bears against the circumferential cup wall and the outer side together with the cup wall forms a clamping zone, in which the first current output conductor is clamped.

There is therefore an effective electrical contact-connection between the positive-polarity housing half and the first current output conductor, without this requiring welding of the first current output conductor to the positive-polarity housing half.

It is particularly preferable that the positive-polarity housing half consists of aluminum or of an aluminum alloy, i.e., it is produced from a sheet of aluminum or an aluminum alloy. Furthermore, it is particularly preferable that the negative-polarity housing half consists of steel or iron or is produced from sheet steel or sheet iron.

It is furthermore preferable that the first current output conductor consists of aluminum or of an aluminum alloy, if appropriate of the same alloy as the positive-polarity housing half.

It has been found that cells having these features have a very high electrochemical stability, without this involving negative side effects, for example, a higher leakage rate. The combination of halves made of the entirely different materials is first responsible for this. Conventional button cells, in which both housing halves consist of the aforementioned nickel-plated high-grade steel, are distinguished by a very high tightness, but often also by a relatively low electrochemical stability. The combination of halves made of aluminum with high-grade steel ensures a more stable cell structure since aluminum as a material has a lower mechanical strength and a higher ductility than steel and, therefore, leakages would increasingly be expected. Second, it is also very advantageous if a current output conductor consists of the same material as the housing half connected thereto since in this way local elements cannot form.

If the housing half consists of an aluminum alloy, this generally comprises at least 30% by weight, preferably more than 60% by weight, particularly preferably more than 90% by weight aluminum. This similarly also applies to the aforementioned current collectors and current output conductors made of an aluminum alloy.

The steel is preferably a high-grade steel, in particular a stainless high-grade steel.

Preferably, the sheet steel or sheet iron is coated with nickel or a nickel alloy on that side of the sheet steel or sheet iron which forms the outer side of the button cell housing during use.

Further preferably, the sheet steel or sheet iron is coated with copper or a copper alloy, for example, a copper-tin or copper-lead alloy, on that side of the sheet steel or sheet iron forming the inner side of the button cell housing during use.

It is particularly preferable that the sheet steel or sheet iron has both the coating of nickel or the nickel alloy and the coating of copper or of the copper alloy. In this example, the nickel can protect the housing against corrosion on the outside, while the copper coating on the inner side guarantees electrochemical stability.

The first current output conductor can connect to the first band-shaped current collector of the at least one positive electrode by welding. By way of example, a current output conductor can be welded perpendicularly onto the collector band of a band-shaped electrode to be wound, as is described in WO 2010/146154 A2. After winding, the current output conductor protrudes out of the resulting winding at the end, and can be placed down on the circumferential outer side of the winding (and therefore in the clamping zone) by being turned down.

Particularly preferably, the first current output conductor is, however, a partial portion of the first current collector not covered by electrochemical active material, in particular a terminal portion of the first current collector. In the simplest case, by way of example, production of the positive electrode can involve use of a collector band having a length exceeding the length of the assembly to be produced. This band is not coated with active material over its entire length, but instead an end piece remains uncoated. If the collector coated with active material is combined with a separator and a counterelectrode of appropriate length such that the uncoated end piece protrudes, and the resultant assembly is then wound on proceeding from the coated end piece, what is obtained is a winding with the uncoated end piece being supported on the outer side thereof. This end piece can come into contact with the circumferential cup wall of the positive-polarity housing half over a large area.

Preferably, the second metallic current output conductor connects to the negative-polarity housing half by welding, for example, like the current output conductors of the electrode winding described in WO 2010/146154 A2.

The negative-polarity housing half preferably also has a cup-shaped form and has a cup base, a circumferential cup wall, a cup edge with a terminal cutting edge and a cup opening defined by the cup edge.

Both the base of the cup-shaped positive-polarity housing half and the base of the cup-shaped negative-polarity housing half preferably have a planar form. Where appropriate, the bases form the aforementioned planar housing bottom side or housing top side of the button cell housing and, as already mentioned, preferably accordingly have a circular or oval form. The bases are adjoined in each case, in some cases via a shoulder region, by the aforementioned cup wall in a radially circumferential manner. The latter is preferably oriented orthogonally to the respective base and usually has a cylindrical geometry. Preferably, the internal and external radius of the cup wall are substantially constant over the entire wall height.

It is preferable that the diameter of the cup-shaped housing half made of aluminum or the aluminum alloy is smaller than the diameter of the cup-shaped housing half made of sheet steel or sheet iron, and therefore the former can be pushed into the latter with the cup edge to the fore. A suitable seal is preferably threaded onto the outer side of the cup wall of the housing half made of aluminum or the aluminum alloy before the latter is pushed in.

Correspondingly, it is particularly preferable that the positive-polarity cup-shaped housing half is arranged with the cup edge to the fore in the negative-polarity cup-shaped housing half made of sheet steel or sheet iron.

Alternatively, it is also possible that the positive-polarity housing half has the described cup shape, whereas the negative-polarity housing half is in the form of a flat bowl. In contrast to the cup shape, this bowl shape is distinguished by the absence of a cup wall. Like the cup, the bowl also has a planar base, which where appropriate forms the aforementioned planar housing bottom side or housing top side of the button cell housing. However, it is not adjoined, for instance, by a wall oriented orthogonally thereto, but rather directly by a radially circumferential edge with a terminal cutting edge.

In this alternative, it is preferable that the cup-shaped positive-polarity housing half sits with the cup edge to the fore on the base of the bowl-shaped negative-polarity housing half There is preferably a form-fitting connection between the two housing halves of the housing closed in a liquid-tight manner. In this case, this is to be understood as meaning that the two housing halves cannot be separated from one another without at least one of the housing halves having to be deformed in the process. The form fit is preferably realized by virtue of the fact that the edge of the cup-shaped or bowl-shaped housing half made of sheet steel or sheet iron is bent radially inwardly or pulled in.

If both the positive-polarity housing half and the negative-polarity housing half are present in a cup-shaped form, the form-fitting connection is preferably realized in that the positive-polarity housing half is pushed with the cup edge to the fore into the negative-polarity housing half, and then the opening edge of the negative-polarity housing half is pressed radially inwardly or pulled in until the desired form fit arises. This procedure is usually referred to as crimping.

Alternatively, it is possible to realize a form-fitting connection as follows: in a first step, the cup edge of a cup-shaped positive-polarity housing half is bent radially outwardly, in particular such that the bent edge assumes an angle of 90° to the casing. As a result, the thus deformed housing half has a hat-like cross section, with the bent forming the hat brim. With the brim to the fore, the housing half is then positioned centrally on a disk made of sheet steel or sheet iron, which is processed by forming to give the described bowl-shaped housing half. To this end, the edge of the disk is turned down radially inward—over the bent opening edge of the cup-shaped housing half—such that a circumferential flange is formed. In the latter, the bent opening edge of the cup-shaped housing half is surrounded in a U-shaped manner by the bent edge of the bowl-shaped housing half. A suitable seal is preferably threaded onto the bent opening edge of the cup-shaped housing half before the latter is positioned on the disk.

Both conventional injection-molded seals and film seals are moreover suitable in principle as seals for button cells, the production of these seals being described in DE 196 47 593 A1.

Preferably, the housing of the button cell can be formed like that of the button cell described in WO 2012/048995 A1. In these cases, it may optionally be the case that the cell cup (101) disclosed in WO 2012/048995 A1 consists of the sheet steel or sheet iron and the cell top (102) consists of the aluminum or the aluminum alloy, or vice versa.

In the assembly of the electrodes and the at least one separator, the electrodes and the separator are preferably combined in the following sequences:

separator/positive electrode/separator/negative electrode or separator/negative electrode/separator/positive electrode.

Button cells having such electrode/separator assemblies are known, for example, from DE 10 2010 033 577 A1.

It is particularly preferable that the electrode/separator winding is present in a button cell in a radially and/or axially pressed or compressed form.

Pressing or compression of this nature can be realized, for example, in that the electrode winding is introduced dry into the cup-shaped positive-polarity housing half, the winding is impregnated with electrolyte and the button cell housing is closed, for example, by crimping.

To generate radial pressing, the diameter of the winding is matched as precisely as possible to the diameter of the positive-polarity housing half. As a rule, the winding swells as a consequence of being impregnated with electrolyte. This causes radial expansion of the winding, and when the diameters have been matched in a correspondingly precise manner, this has the effect that the circumferential outer side of the winding is pressed against the cup wall of the positive-polarity housing half and together with the latter forms the aforementioned clamping zone, in which the first current output conductor is clamped.

As an alternative or in addition, a force can also be applied to the winding radially from the inside outward by a winding core.

To generate the axial pressing, the height of the winding (the distance between the two end sides thereof) is matched as precisely as possible to the height of the button cell housing (the distance between the top side and the bottom side parallel thereto). As a rule, the winding swells as a consequence of being impregnated with electrolyte. This causes stretching of the winding (which is minor compared to the aforementioned radial expansion of the winding) in the axial direction, but when the heights have been matched in a correspondingly precise manner, this has the effect that the end sides of the winding can also be pressed against the top side and the bottom side of the housing.

This effect can be utilized to reliably connect the current collector or the current collectors of the at least one negative electrode to the negative-polarity housing half, without this requiring a welding operation on the housing half.

For production of the winding, it is therefore possible, for example, to use a band-shaped negative electrode having a current collector coated on both sides with electrochemical active material and having an uncoated longitudinal edge. This uncoated longitudinal edge can serve as a second metallic current output conductor. If an assembly of such an electrode band, a separator and a suitable counterelectrode is processed to form a winding, the longitudinal edge (or at least part of the longitudinal edge if it has been cut before the winding) protrudes out of the resulting winding at the end (on an end side) after the winding. In axial pressing, that part of the current collector protruding out of the winding at the end can establish a direct electrical connection to the base of the negative-polarity housing half resting against the end side. To this end, it goes without saying that the winding has to be arranged in the cup-shaped positive-polarity housing half such that the end side out of which the uncoated longitudinal edge protrudes points in the direction of the cup opening and not in the direction of the cup base of the positive-polarity housing half.

If, by contrast, it is desired to connect the second metallic current output conductor to the negative-polarity housing half by welding, a suitable procedure is described in the aforementioned WO 2010/146154 A2. According to the described procedure, a current output conductor is perpendicularly welded onto the collector band of an electrode to be wound. After winding, the current output conductor protrudes out of the resulting winding at the end, and is placed down flat on the end side by being turned down. It preferably connects to the housing half by welding. To this end, the winding is inserted into a housing made up of the housing part and a counterpart corresponding thereto. The welding is effected, after the housing has been closed, by a laser from the outside through the base of the housing half.

This procedure is also applicable in case. If appropriate, however, welding the current output conductor onto the housing half can be dispensed with, for example, if the described axial pressing is induced.

If the button cell is a lithium-ion button cell, the electrolyte used moreover is preferably solutions of lithium salts such as lithium hexafluorophosphate in organic solvents such as ethers and esters of carbonic acid (organic carbonates).

Particularly preferably, the housing half made of aluminum or the aluminum alloy, in particular the base of the housing half, is designed as a rupture membrane. For this purpose, it can be provided that the housing half, in particular the base thereof, has one or more, preferably two, intersecting weakening lines, along which the wall thickness of the housing half is reduced. In an increase in pressure in the interior of the housing, these weakening lines form a predetermined rupture point, at which the cell housing can rip open to allow pressure to escape from the cell in a controlled manner.

Given an appropriate cell configuration, major advantages arise in particular from the electrochemical stability of the aluminum or of the aluminum alloy with respect to the cathode (positive pole) and also from the mechanical deformability and the rupture membrane which can readily be set as a result in terms of a low rupture pressure. The disadvantage of the relatively low mechanical stability of the aluminum half is compensated for by the high-grade steel half (negative pole). What is obtained as a whole is an optimum electrochemical and mechanical stability of the cell.

The aforementioned advantages and further advantages also become apparent from the description of the drawings, which now follows. Individual features can be implemented on their own or in combination with one another. The examples described merely serve to explain and provide a better understanding and are in no way to be understood as having a limiting effect.

FIG. 1 shows the housing half (101) and the housing half (102). The housing half (102) has a positive polarity and consists of aluminum. The housing half (101) consists of high-grade steel and has a negative polarity. Together with the seal (103) arranged between the two housing halves (101) and (102) and electrically insulates the parts, the housing halves form a cylindrical housing closed in a liquid-tight manner.

The two housing halves (101) and (102) have a cup-shaped form. They each have a circular cup base (104) and (105) and also a circumferential cup wall (106) and (107). The bases (104) and (105) form the top side and the bottom side of the cylindrical housing. The circumferential cup wall (107) of the housing half (102) has a smaller internal and external radius than the cup wall (106) of the housing half (101). The housing half (102) is pushed with the cup edge (108) to the fore into the housing half (101) to such an extent that the cup edge (108) sits on the base (105) and direct contact with the base (105) is prevented only by the seal (103). The cup edge (109) of the housing half (101) is bent radially inwardly and ensures that there is a form fit in the axial direction. It is not possible for the housing half (102) to be pulled out of the housing half (101) without deforming the housing half (101).

The electrode/separator winding (111) is arranged within the housing. It consists of a band-shaped positive electrode (113), a band-shaped negative electrode (114) and a separator (115) arranged between the electrodes. The positive electrode (113) comprises a band of aluminum foil (116) as a first current collector. The negative electrode (114) comprises a band of copper foil (117) as a second current collector. The positive electrode (113) electrically connects to the housing half (102) via the metallic current output conductor (118). The negative electrode (114) electrically connects to the housing half (101) via the metallic current output conductor (119).

The electrodes (113) and (114) and the separator (115) are present in the form of an assembly formed by lamination. The assembly is wound in a spiral shape onto the winding core (112). The winding has two end sides, which lie flat against the bases (104) and (105), and also a circumferential outer side (120).

The metallic current output conductor (118) is welded onto the band-shaped current collector (116). The metallic current output conductor (119) is welded onto the band-shaped current collector (117). The current output conductors emerge from the winding at the two end sides. The current output conductor (118) is placed down on the outer side (120) of the winding (111) by being turned down. Together with the cup wall (107), the outer side forms a clamping zone (121). If, for example, addition of an electrolyte causes swelling of the winding, associated with a radial expansion, the current output conductor (118) is pressed against the cup wall (107) and clamped between the outer side (120) and the cup wall (107). Welding the current output conductor (118) to the housing half (102) is then not necessary as a result of this clamping contact-connection (the pressing of the winding against the cup wall is not shown for reasons of clarity). In contrast, the current output conductor (119) connects to the housing half (101) by welding in the base region (105).

A rupture cross (110) made up of two intersecting weakening lines is worked into the base (104) of the housing half (102).

Figure 2:
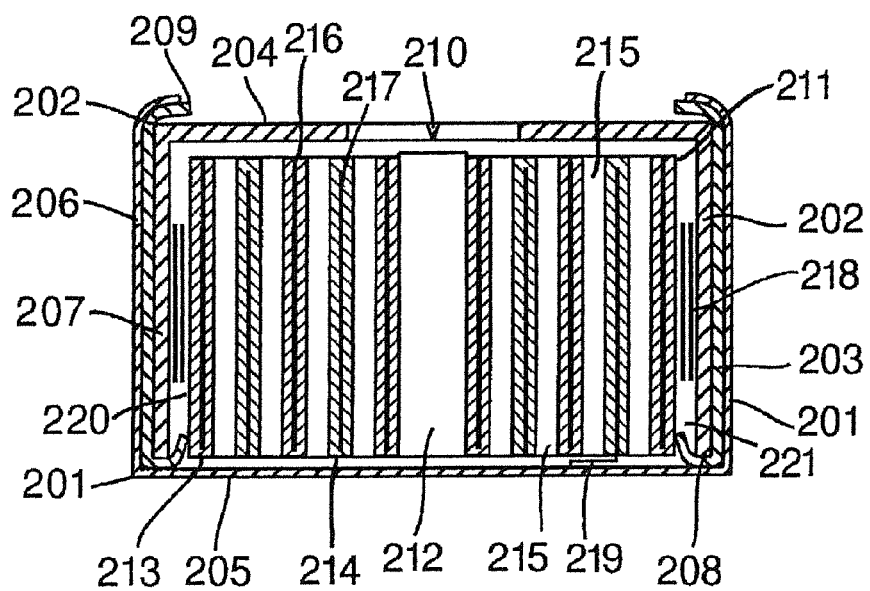
FIG. 2 shows a cross section of a second example of a button cell (schematic illustration).

FIG. 2 shows the housing half (201) and the housing half (202). The housing half (202) has a positive polarity and consists of aluminum. The housing half (201) consists of high-grade steel and has a negative polarity. Together with the seal (203) arranged between the two housing halves (201) and (202) and electrically insulates the parts, the housing halves form a cylindrical housing closed in a liquid-tight manner.

The two housing halves (201) and (202) have a cup-shaped form. They each have a circular cup base (204) and (205) and also a circumferential cup wall (206) and (207). The bases (204) and (205) form the top side and the bottom side of the cylindrical housing. The circumferential cup wall (207) of the housing half (202) has a smaller internal and external radius than the cup wall (206) of the housing half (201). The housing half (202) is pushed with the cup edge (208) to the fore into the housing half (201) to such an extent that the cup edge (208) sits on the base (205) and direct contact with the base (205) is prevented only by the seal (203). The cup edge (209) of the housing half (201) is bent radially inwardly and ensures that there is a form fit in the axial direction. It is not possible for the housing half (202) to be pulled out of the housing half (201) without deforming the housing half (201).

The electrode/separator winding (211) is arranged within the housing. It consists of a band-shaped positive electrode (213), a band-shaped negative electrode (214) and a separator (215) arranged between the electrodes. The positive electrode (213) comprises a band of aluminum foil (216) as a first current collector. The negative electrode (214) comprises a band of copper foil (217) as a second current collector. The positive electrode (213) electrically connects to the housing half (202) via the metallic current output conductor (218). The negative electrode (214) electrically connects to the housing half (201) via the metallic current output conductor (219).

The electrodes (213) and (214) and the separator (215) are present in the form of an assembly formed by lamination. The assembly is wound in a spiral shape onto the winding core (212). The winding has two end sides, which lie flat against the bases (204) and (205), and also a circumferential outer side (220).

The metallic current output conductor (218) is a terminal portion of the first current collector (216) not covered by electrochemical active material and guided around the wound assembly in two turns and is supported on the outer side (220) thereof. Together with the cup wall (207), the outer side (220) forms a clamping zone (221). If, for example, addition of an electrolyte causes swelling of the winding, associated with a radial expansion, the current output conductor (218) is pressed against the cup wall (207) and clamped between the outer side (220) and the cup wall (207). Welding of the current output conductor (218) to the housing half (202) is then not necessary as a result of this clamping contact-connection (the pressing of the winding against the cup wall is not shown for reasons of clarity).

The metallic current output conductor (219) is welded onto the band-shaped current collector (217). The current output conductor (219) emerges from the winding (211) at one of the two end sides. It connects to the housing half (201) by welding in the base region (205).

A rupture cross (210) made up of two intersecting weakening lines is worked into the base (204) of the housing half (202).

Figure 3:
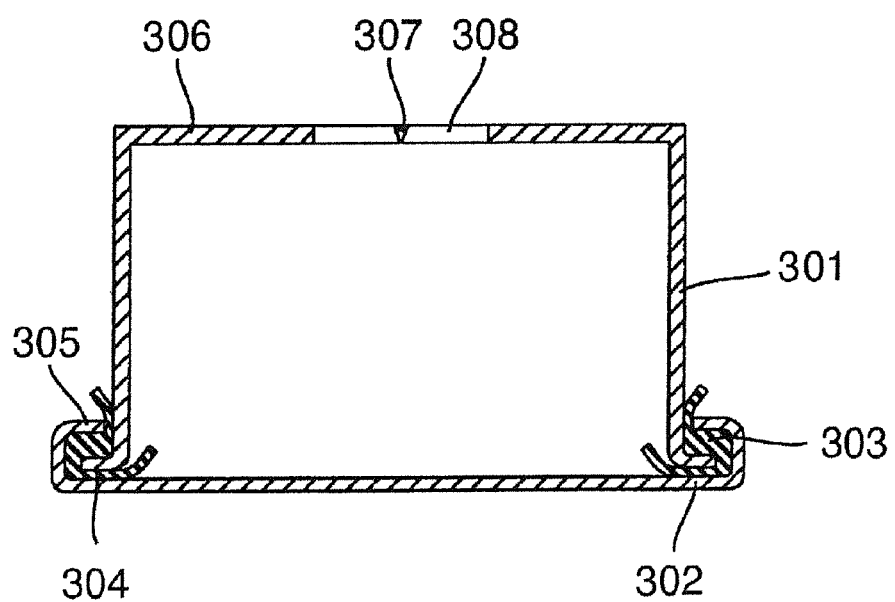
FIG. 3 shows a cross section of the housing of a third example of a button cell (schematic illustration).

FIG. 3 shows the cup-shaped housing half (301). This is inserted into the housing half (302) of bowl-shaped form. The housing half (301) consists of aluminum and the housing half (302) consists of high-grade steel. Together with the seal (303) arranged between the two housing halves and electrically insulates the parts, the housing halves form a housing closed in a liquid-tight manner.

The opening edge (304) of the housing half (301) is bent radially outwardly such that the housing half (301) in its entirety has a hat-like cross section (with the outwardly bent edge forming the brim of the hat). The edge (305) of the housing half (302) is turned radially down around the outwardly bent opening edge (304) of the housing half (301) such that the opening edge (304) is surrounded in a U-shaped manner by the edge (305), with a circumferential flange being formed.

The electrodes arranged within the housing are not shown. The housing is suitable, for example, to receive the electrode/separator winding (111) shown in FIG. 1.

The invention claimed is:

1. A button cell comprising:
   a cylindrical housing closed in a liquid-tight manner and having a planar housing bottom side, a planar housing top side parallel thereto and a circumferential lateral housing casing arranged therebetween, and
   an assembly of at least one band-shaped positive electrode, at least one band-shaped negative electrode and at least one band-shaped separator within the housing, wherein
   the housing consists of a positive-polarity and a negative-polarity metallic housing half separated from one another by an electrically insulating seal,
   the at least one positive electrode comprises a first band-shaped current collector covered by electrochemical active material and electrically connected to the positive-polarity housing half via a first metallic current output conductor,
   the at least one negative electrode comprises a second band-shaped current collector covered by electrochemical active material and electrically connected to the negative-polarity housing half via a second metallic current output conductor,
   the assembly is a spiral-shaped winding having two flat end sides and a circumferential outer side, and
   the positive-polarity housing half has a cup-shaped form and a cup base, a circumferential cup wall, a cup edge with a terminal cutting edge and a cup opening defined by the cup edge,
   the winding is arranged in the cup-shaped, positive-polarity housing half such that one of the flat end sides points in the direction of the cup base, the circumferential outer side thereof bears against the circumferential cup wall and the outer side together with the cup wall forms a clamping zone in which the first current output conductor is clamped,
   the positive-polarity housing half consists of aluminum or of an aluminum alloy and the negative-polarity housing half consists of sheet steel or sheet iron,
   the positive-polarity housing half is arranged with the cup edge thereof to the fore into the cup-shaped negative-polarity housing half made of sheet steel or sheet iron,
   the first current output conductor consists of aluminum or an aluminum alloy and is a terminal partial region of the first current collector not covered by electrochemical active material, and
   there is a direct electrical contact between the first current output conductor and the circumferential cup wall in the clamping zone.

2. A button cell comprising:
   a cylindrical housing closed in a liquid-tight manner and having a planar housing bottom side, a planar housing top side parallel thereto and a circumferential lateral housing casing arranged therebetween, and
   an assembly of at least one band-shaped positive electrode, at least one band-shaped negative electrode and at least one band-shaped separator within the housing, wherein
   the housing consists of a positive-polarity and a negative-polarity metallic housing half separated from one another by an electrically insulating seal,
   the at least one positive electrode comprises a first band-shaped current collector covered by electrochemical active material and electrically connected to the positive-polarity housing half via a first metallic current output conductor,
   the at least one negative electrode comprises a second band-shaped current collector covered by electrochemical active material and electrically connected to the negative-polarity housing half via a second metallic current output conductor,
   the assembly is present in the form of a spiral-shaped winding having two flat end sides and a circumferential outer side,
   the positive-polarity housing half has a cup-shaped form and a cup base, a circumferential cup wall, a cup edge with a terminal cutting edge and a cup opening defined by the cup edge,
   the winding is arranged in the cup-shaped, positive-polarity housing half such that one of the flat end sides points in the direction of the cup base, the circumferential outer side thereof bears against the circumferential cup wall and the outer side together with the cup wall forms a clamping zone in which the first current output conductor is clamped, and
   there is a direct electrical contact between the first current output conductor and the circumferential cup wall in the clamping zone.

3. The button cell as claimed in claim 2, wherein the positive-polarity housing half consists of aluminum or of an aluminum alloy and the negative-polarity housing half consists of sheet steel or sheet iron.

4. The button cell as claimed in claim 2, wherein the first current output conductor consists of aluminum or an aluminum alloy.

5. The button cell as claimed in claim 2, wherein the first current output conductor is a partial region of the first current collector not covered by electrochemical active material.

6. The button cell as claimed in claim 2, wherein the negative-polarity housing half has a cup-shaped form and has a cup base, a circumferential cup wall, a cup edge with a terminal cutting edge and a cup opening defined by the cup edge.

7. The button cell as claimed in claim 6, wherein the positive-polarity housing half is arranged with the cup edge thereof to the fore in the cup-shaped negative-polarity housing half made of sheet steel or sheet iron.

8. The button cell as claimed in claim 2, wherein the negative-polarity housing half has a bowl-shaped form and has a base and also an edge with a terminal cutting edge.

9. The button cell as claimed in claim 8 wherein the cup-shaped positive-polarity housing half sits with the cup edge to the fore on the base of the bowl-shaped negative-polarity housing half.

10. The button cell as claimed in claim 2, further comprising a form-fitting connection between the two housing halves of the housing closed in a liquid-tight manner.

11. The button cell as claimed in claim 10, wherein the form fit is realized by virtue of the fact that the edge of the cup-shaped or bowl-shaped housing half made of sheet steel or sheet iron is bent radially inward.

12. The button cell as claimed in claim 2, wherein a force is applied to the winding radially from the inside outwardly by a winding core.

13. The button cell as claimed in claim 2, wherein the winding is present in a radially and/or axially pressed or compressed form.

14. The button cell as claimed in claim 2, wherein the positive-polarity housing half is designed as a rupture membrane.

* * * * *